(12) United States Patent
Schmidt

(10) Patent No.: US 11,984,923 B2
(45) Date of Patent: May 14, 2024

(54) UNDERWATER VR HEADSET

(71) Applicant: VR COASTER GMH & CO. KG, Kaiserslautern (DE)

(72) Inventor: Joachim Schmidt, Löffingen (DE)

(73) Assignee: VR COASTER GMBH & CO. KG, Kaiserslautern (DE)

( * ) Notice: Subject to any disclaimer, the term of this patent is extended or adjusted under 35 U.S.C. 154(b) by 346 days.

(21) Appl. No.: 17/293,369

(22) PCT Filed: Oct. 28, 2019

(86) PCT No.: PCT/EP2019/079432
§ 371 (c)(1),
(2) Date: May 12, 2021

(87) PCT Pub. No.: WO2020/099112
PCT Pub. Date: May 22, 2020

(65) Prior Publication Data
US 2022/0014224 A1    Jan. 13, 2022

(30) Foreign Application Priority Data

Nov. 13, 2018 (DE) ..................... 10 2018 128 435.7

(51) Int. Cl.
| | | |
|---|---|---|
| H04M 1/02 | (2006.01) | |
| B63C 11/12 | (2006.01) | |
| G02B 13/00 | (2006.01) | |
| H04B 1/3888 | (2015.01) | |
| H04B 1/38 | (2015.01) | |

(52) U.S. Cl.
CPC ............ *H04B 1/3888* (2013.01); *B63C 11/12* (2013.01); *G02B 13/0095* (2013.01);
(Continued)

(58) Field of Classification Search
CPC .......... H04B 1/3888; H04B 2001/3894; B63C 11/12; B63C 2011/121; B63C 2011/128;
(Continued)

(56) References Cited

U.S. PATENT DOCUMENTS

2010/0302233 A1* 12/2010 Holland .................. G06T 19/00
                                                    707/E17.018
2016/0005232 A1    1/2016 Quarles
(Continued)

FOREIGN PATENT DOCUMENTS

| CN | 106697231 A | 5/2017 | |
|---|---|---|---|
| CN | 206817284 | * 12/2017 | ............ G03B 15/02 |
| WO | 2019/059959 A1 | 3/2019 | |

OTHER PUBLICATIONS

Office action from corresponding German application No. 10 2018 128 435.7 dated Jul. 26, 2019.
(Continued)

*Primary Examiner* — Andrew Wendell
(74) *Attorney, Agent, or Firm* — Nath, Goldberg & Meyer; Jerald L. Meyer

(57) ABSTRACT

The present invention relates to an underwater VR headset (1) comprising a diving mask (10), which can be placed on a diver's head on the diver's face in a viewing direction (5), and an underwater display unit (20), wherein the underwater display unit (20) is arranged behind the diving mask (10) in the viewing direction (5) of the diver, wherein the underwater display unit (20) comprises a housing (22) and at least one VR display unit (25) arranged in the housing (22), wherein a virtual reality displayed by the VR display unit (25) can be perceived by the diver through the diving mask (10) and the housing (22), and wherein the housing (22) is gas-tight and liquid-tight. Moreover, the present invention relates to a diving mask (10) and an underwater display unit (20).

18 Claims, 3 Drawing Sheets

Figure 1:
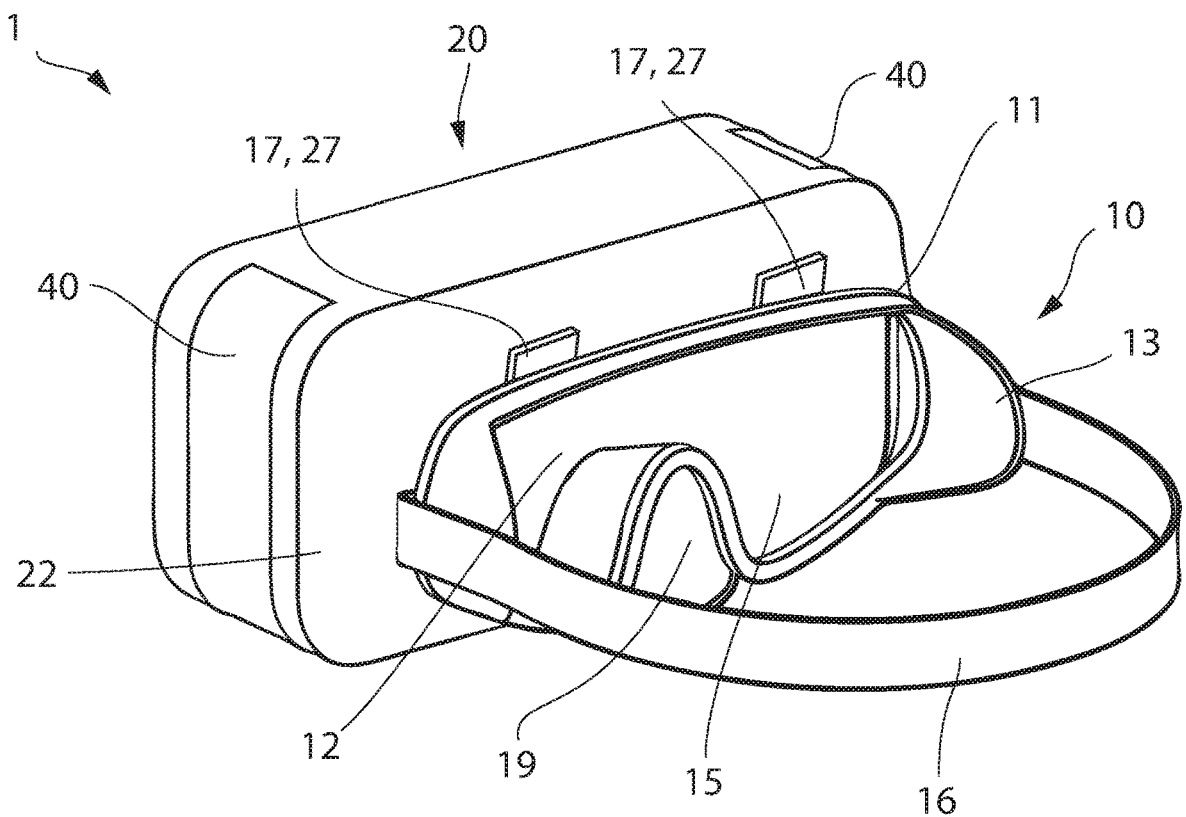

(52) U.S. Cl.
CPC ... *B63C 2011/121* (2013.01); *B63C 2011/128* (2013.01); *H04B 2001/3894* (2013.01)

(58) Field of Classification Search
CPC .......... G02B 13/0095; G02B 2027/014; G02B 2027/0156; G02B 27/0176; G02B 27/0172; H04M 1/0266; H04M 1/0295
See application file for complete search history.

(56) References Cited

U.S. PATENT DOCUMENTS

| | | | | |
|---|---|---|---|---|
| 2016/0127716 | A1* | 5/2016 | Ramiro | B63C 11/12 348/53 |
| 2019/0094540 | A1* | 3/2019 | Greenwood | H04W 4/30 |

OTHER PUBLICATIONS

International Search Report for corresponding PCT application No. PCT/EP2019/079432 dated Feb. 3, 2020.
AFP "Nager avec des dauphins Virtuels, une therapie Bien reelle", Internet URL:https://www.youtube.com/watch?v=eGQzpUHTSvc &feature=emb; Nov. 19, 2017; XP054980160.
Rachel Metz: "Using Virtual Reality Underwater is Weird (but fun)", MIT Technology Review, Feb. 20, 2017; XP055661776.
Remote Llc: "Project Nautilus VR, virtual reality underwater", Internet URL:https://www.kickstarter.com/projects/remotte/project-nautilus-vr-virtual-reality-underwater/description; Mar. 14, 2015; XP055661602.

* cited by examiner

UNDERWATER VR HEADSET

This is a National Phase Application filed under 35 U.S.C. 371 as a national stage of PCT/EP2019/079432 filed Oct. 28, 2019, an application claiming the benefit of German Application No. 10 2018 128 435.7 filed Nov. 13, 2018, the content of each of which is hereby incorporated by reference in its entirety.

The present invention relates to an underwater VR headset with the features of claim 1 and a diving mask for an underwater VR headset with the features of claim 17, and an underwater display unit for an underwater VR headset with the features of claim 18.

VR headsets are known from prior art in different configurations and are used to display artificially generated representations in the user's field of vision. VR headsets consist of one or two display units that are used for stereographic display. The user can perceive the content shown on the display unit by means of a lens, which is arranged in the user's field of vision. For this purpose, the VR headset can be positioned or fastened on the head and in front of the eyes of the user, wherein the content displayed by the display unit should cover as large an area as possible in the person's field of vision. This type of display device is used primarily to display digitally generated content in so-called virtual reality. The representation of virtual reality can be adapted in real time depending on the position and/or the orientation of the VR headset synchronously with the head movement of the user, whereby the represented virtual reality is perceived as particularly authentic by the user and achieves a high degree of immersion.

It has turned out to be a disadvantage of this prior art that the VR headsets known from prior art are not suitable for underwater applications. On the one hand, account must be taken of the fact that an underwater environment is a hostile habitat for a human user, in which survival without an additional oxygen supply is only possible for a very short period of time. Taking this into account, the user's sense of safety is an essential aspect, as he should be able to safely escape the represented virtual reality even when he reaches a particularly high degree of immersion, without exposing himself completely and unprotected to the danger of the hostile underwater habitat. In addition, the VR headsets known from prior art cannot be used for underwater applications for various reasons, since they are neither designed for underwater applications, nor would they actually survive such an application unscathed.

This is where the present invention starts.

It is therefore the object of the present invention to improve the VR headsets known from prior art in an expedient manner in order to provide underwater VR headsets that are, on the one hand, safe and easy to use, and contribute toward the safety of the user during his experience of virtual reality because of their ease of use. The underwater VR headset should be particularly comfortable to wear, namely so that the user's head is neither pulled to the surface of the water by buoyancy forces nor the entire underwater VR headset unintentionally lifted off the face of the user or the diver. In addition, the underwater VR headset should be suitable for longer dives and dives to greater depths, and for this purpose should include powerful electronics that enable the underwater VR headset to be operated for several hours. Furthermore, the underwater VR headset according to the invention should have a representation of virtual reality in a large field of vision within the line of vision of the diver in order to be able to represent virtual reality in the full field of vision of the user.

These objects are achieved by an underwater VR headset with the features of claim 1 as well as a diving mask with the features of claim 17 and an underwater unit with the features of claim 18.

Further advantageous configurations of the invention are specified in the dependent claims.

The underwater VR headset according to the invention with the features of claim 1 comprises a diving mask that can be placed on a face in a viewing direction of a diver. The diving mask is preferably made of a soft plastic which forms a receiving space in which the eyes and possibly also the nose of the diver can be received. In addition, the underwater VR headset according to the invention comprises an underwater display unit, wherein the underwater display unit is arranged behind the diving mask in the viewing direction of the diver. The underwater display unit has at least one VR display unit arranged in a housing, wherein the VR display unit can be perceived by the diver in the viewing direction through the housing and through the diving mask, and wherein the housing is gas- and liquid-tight. The diving mask comprises a frame with a sealing lip and can be closed in a watertight manner on the side facing away from the diver by the underwater display unit or a viewing window. The sealing lip is arranged circumferentially around the receiving space on the side facing the diver, and is designed to lie tightly against the face of the diver and thus to seal the receiving space against the face or head of the diver. The diving mask can be a partial mask that only partially covers the diver's face, or a full mask that completely covers the face, or a diving helmet that completely surrounds the diver's head.

According to an advantageous development of the invention, the diving mask can have first fastening means and the housing of the underwater display unit can have second fastening means. By means of the first fastening means and the second fastening means, the underwater display unit can be held in a detachable manner on the diving mask, whereby a modular system is created, which can be optimally adapted to the diver. The diving mask can be individually adapted, for example, to the shape of the diver's face, in particular to the size of the diver, whereby the diving mask enables the best possible sealing of the face. The diving mask can be closed in the viewing direction by a viewing window, whereby a plenum around the eyes is tightly separated from the underwater environment in the receiving space of the diving mask. In the viewing direction of the user, the underwater display unit for displaying virtual reality is arranged behind the viewing window, whereby the diver can see the virtual reality reproduced by the VR display unit through the viewing window. According to the present invention, the underwater display unit can be attached to the diving mask, clipped on or detachably fastened in any way, whereby the diver can remove the underwater display unit from the diving mask during the dive in order to be able to perceive the real underwater environment around him.

Furthermore, it has proven to be advantageous if the first fastening means and the second fastening means enable the underwater display unit to be pivoted on the diving mask, whereby the underwater display unit can be pivoted into the field of vision and out of the field of vision of the diver. In particular, it has proven to be advantageous if the underwater display unit is held on the diving mask such that it can pivot in a pretensioned manner. The underwater display unit can be held in a pretensioned manner in the diver's field of vision. Furthermore, a quick opening mechanism can be provided, by means of which the underwater display unit is pivoted out of the field of vision when actuated. Thus, the diver can leave virtual reality in dangerous situations, when feeling unwell or the like, and perceive the real underwater environment.

A further advantageous design of the present invention provides that the diving mask has at least one optical lens, which is arranged in the viewing direction between the diver and the underwater display unit. It is particularly preferred if the at least one optical lens is arranged between the diver and the viewing window in the diving mask. The optical lens can be ground in such a way that the field of vision for the user or diver on the VR display unit is diagonal up to 80°, more preferably up to 90°, even more preferably up to 100°, and yet more preferably up to 110°. By arranging the at least one optical lens in the viewing direction between the diver and the viewing window, a greater range of vision than the diving mask and the viewing window would allow can be simulated for the diver, whereby diving without a diving mask can be conveyed or simulated for the diver. In addition, the optical lens can also be detachably arranged on the side of the viewing window facing away from the diver. The viewing window and a frame of the diving mask on the one hand limit the field of vision during a real dive, whilst the diver can also perceive a real underwater environment undistorted by the diving mask when the optical lens is detached or removed on the other hand.

It has also proven to be advantageous if the diving mask and/or the underwater display unit has or have at least one holding means, and that at least one weight can be attached to the at least one holding means. It has been shown that the buoyancy of the diving mask and/or the underwater display unit causes the trapped air to create strong, unwanted buoyancy that either pulls the diver's head toward the surface of the water or even lifts the entire underwater VR headset off the face. By means of the weights, the total weight of the underwater VR headset or the diving mask and the underwater display unit can be adjusted in such a way that buoyancy is balanced and free floating can be adjusted at a water depth that can be adjusted by the amount of weights. This can result in a pleasant and balanced wearing experience for the diver during the dive with the underwater VR headset, whereby the degree of immersion when experiencing the VR experience represented by the VR display unit is particularly high. It has also proven to be advantageous if the weights are arranged on the inside of the housing of the underwater display unit.

It has also proven to be advantageous if the holding means comprise a releasable connection, in particular a clip, plug or magnetic connection, whereby the weight or the buoyancy of the underwater VR headset can be adjusted quickly and individually.

Another preferred design of the present invention provides that the underwater display unit comprises a data processing means in addition to the VR display unit. The data processing means generates the virtual reality to be displayed, on the basis of data stored on a storage medium, amongst other ways, wherein sensors are also provided, which detect the orientation of the head of the user or of the diver. The virtual reality is calculated depending on the sensors and presented to the user or diver by the VR display unit.

In addition, the underwater display unit can comprise an energy store. The energy store is, for example, a rechargeable battery that supplies both the data processing means and the VR display unit with energy. The energy store can, however, also be arranged outside the underwater display unit, for example on the back of the diver's head, in order to reduce one-sided strain on the head (outside of the water). It is essential here that the underwater VR headset can be operated completely independently, whereby the diver is completely free in his movement and there is no risk of the diver getting caught in cable connections or the like. In particular, it is advantageous if the energy store is formed from a large number of cells, wherein the number of cells used is variable as desired, and the individual cells are used as weights with which the total weight of the underwater VR headset or the diving mask and the underwater display unit are adjusted in such a way that buoyancy is balanced, and free floating can be adjusted at a water depth that can be adjusted by the number of cells in the energy store.

According to a further preferred design of the present invention, at least one level sensor is provided which detects the diving depth, whereby this can be displayed realistically. A plurality of level sensors and/or immersion sensors are particularly preferably provided, so that a partially submerged state of the underwater VR headset can also be detected and reproduced true to detail by the VR display unit in virtual reality. The at least one level sensor can be an optical sensor and/or a pressure sensor and/or resistive sensor and/or a capacitive sensor. Ultrasound and/or radar sensors can also be used as level sensors, which can also be used as collision warning devices.

According to a preferred design the VR display unit can be a mobile terminal device, in particular a smartphone, tablet or the like. Known and currently available mobile terminal devices are equipped with powerful graphics cards, high-resolution displays and powerful batteries. The calculation and display of virtual reality lead to an increased power requirement and drastically extended battery runtimes which do not correspond to the required minimum diving time, whereby further energy stores, for example a so-called power bank, can advantageously be arranged in the housing.

In addition, it has proven to be advantageous if the housing is formed from a first housing part and a second housing part. A seal can be arranged or formed between the first housing part and the second housing part. The first housing part and the second housing part can preferably be connected with a quick connection, for example a tension lock, a snap lock, a screw lock or the like, the seal closing the housing in a gas- and liquid-tight manner in the closed state. Due to the at least two-part design of the housing, the housing can be opened for maintenance purposes of the VR display unit, for charging or for data exchange. By opening the housing, for example, an interface, a voltage supply and/or the VR display unit can be accessed, and data can be exchanged with the VR display unit, or the batteries can be charged or replaced, or individual components of the VR display unit or the whole VR display unit can be replaced. According to the present invention, the interface can be any data interface, for example USB, Ethernet, WIFI, Bluetooth or the like. The data can also be exchanged with the underwater VR headset using a portable storage medium, for example a flash memory (USB, SD).

According to a further advantageous design of the present invention, the housing comprises a removable frame into which the VR display unit can be inserted. In particular, such a removable frame has proven to be advantageous if the VR display unit is a mobile terminal device, as different mobile terminal devices have different designs. The removable frame ensures that, on the one hand, the VR display unit is fixedly arranged in the housing of the underwater display unit and, on the other hand, the VR display unit is arranged in the focal point of the at least one optical lens. The virtual reality displayed by the VR display unit is thus displayed sharply for the user or diver.

A further advantageous design of the present invention provides that the housing has at least one heat exchanger which is arranged on an outer side of the housing. While the housing of the underwater display unit is typically made of a plastic, the heat exchanger is made of a metallic material that has good thermal conductivity. It is particularly preferred if the heat exchanger is arranged on the side of the housing facing away from the diver in the viewing direction, whereby a high heat transfer occurs between the water and the heat exchanger even in stagnant water due to forced convection. Alternatively, the heat exchanger can be arranged on an upper side, an underside, and/or on one or both longitudinal sides, the heat exchanger furthermore preferably having a pin and/or fin structure on at least one side, which has a raised surface for improved heat transfer. The heat exchanger is set up to dissipate the heat generated by the VR display unit from the housing, which occurs in particular when calculating the virtual reality.

It has also proven to be advantageous if at least one heat conductor is arranged in the housing, which creates a thermal coupling between the VR display unit and the heat exchanger. Heat can be transported to the heat exchanger through the heat conductor either by actively or passively transporting a cooling medium or by conduction, whereby individual components in the housing are protected from overheating.

It has proven to be advantageous if the at least one heat conductor comprises at least one heat pipe and/or at least one two-phase thermosiphon. The at least one heat conductor should particularly preferably be a heat pipe, as this realizes a very high heat flow density regardless of the direction of action of gravity, which allows the design to be compact and small on the one hand, and ensures a high cooling capacity for the VR display unit on the other hand. The heat conductor can be connected to an electrical component to be cooled, for example, by means of a heat conducting plate, or to the housing of the mobile terminal device, whereby the electrical component or the mobile terminal device is protected against overheating.

According to a further advantageous design of the present invention, the diving mask and the housing of the underwater display unit are arranged spaced apart in the viewing direction, a gap being formed between the diving mask and the housing, through which the water of the underwater environment can be flushed. The gap prevents the optical coupling between the diving mask and the underwater display unit from being disturbed by moisture inclusions, water vapor, air bubbles or the like.

According to a further particularly preferred design of the present invention, the diving mask and the underwater display unit are connected to one another in a gas- and liquid-tight manner, wherein the diving mask and the housing of the underwater display unit are preferably integrally connected (bonded). The diving mask can be closed on the side facing away from the diver by the underwater display unit. The underwater VR headset is thus a particularly compact device, the underwater VR headset preferably having at least one camera, by means of which the optical reality in the diver's field of vision can be captured and displayed on the VR display unit, whereby the diver can quickly switch between virtual reality and the real underwater environment. The underwater VR headset preferably has a sensor system that detects when the diver touches the underwater VR headset and automatically reproduces the actual underwater environment instead of virtual reality in order to prevent the diver from removing the underwater VR headset on impulse and being exposed to the hostile underwater environment in an unprotected way.

Further aspects of the present invention relate to a diving mask and an underwater display unit for an underwater VR headset.

Figure 2:
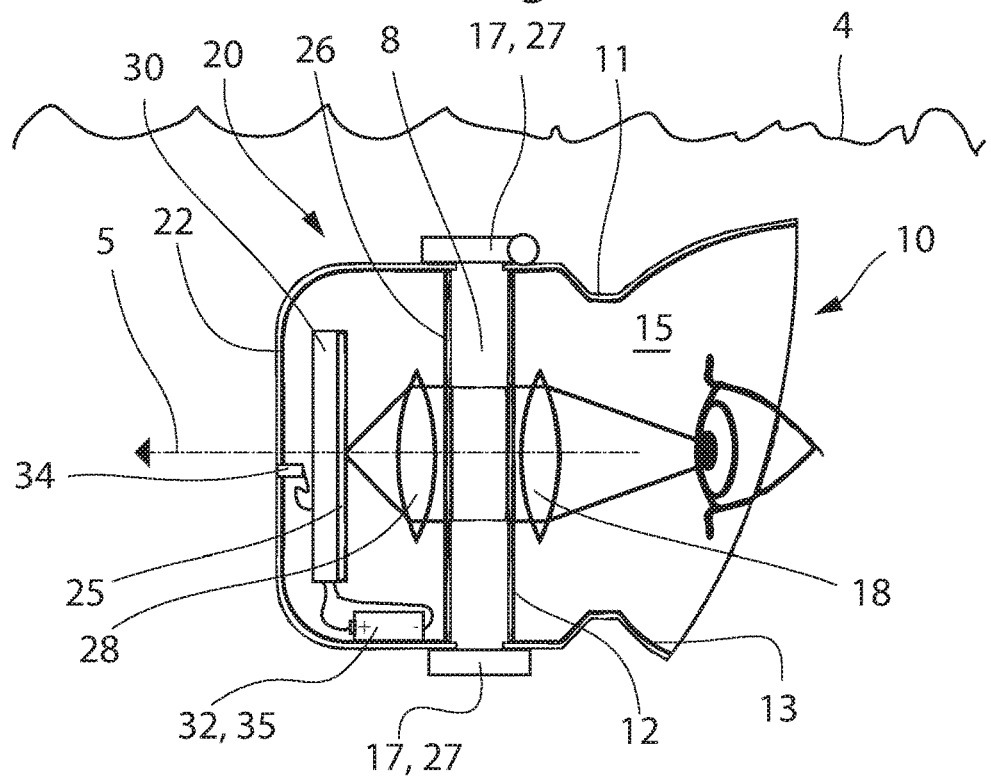
Figure 3:
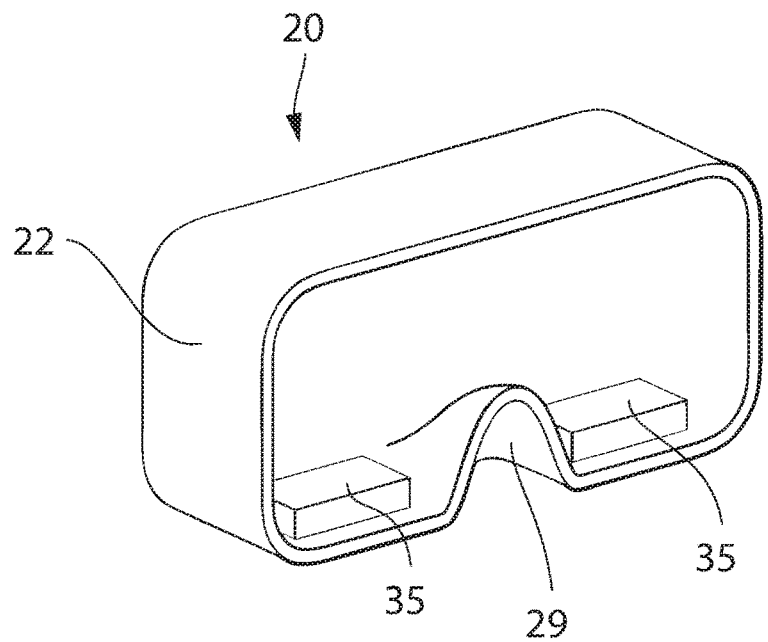
Figure 4:
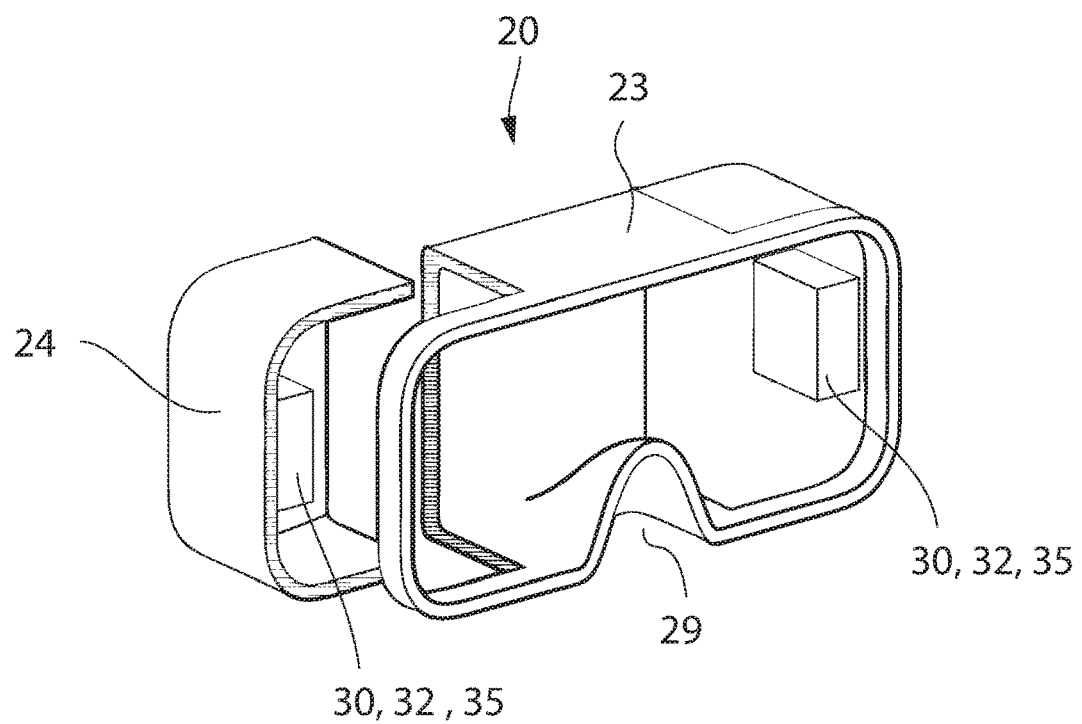
Figure 5:
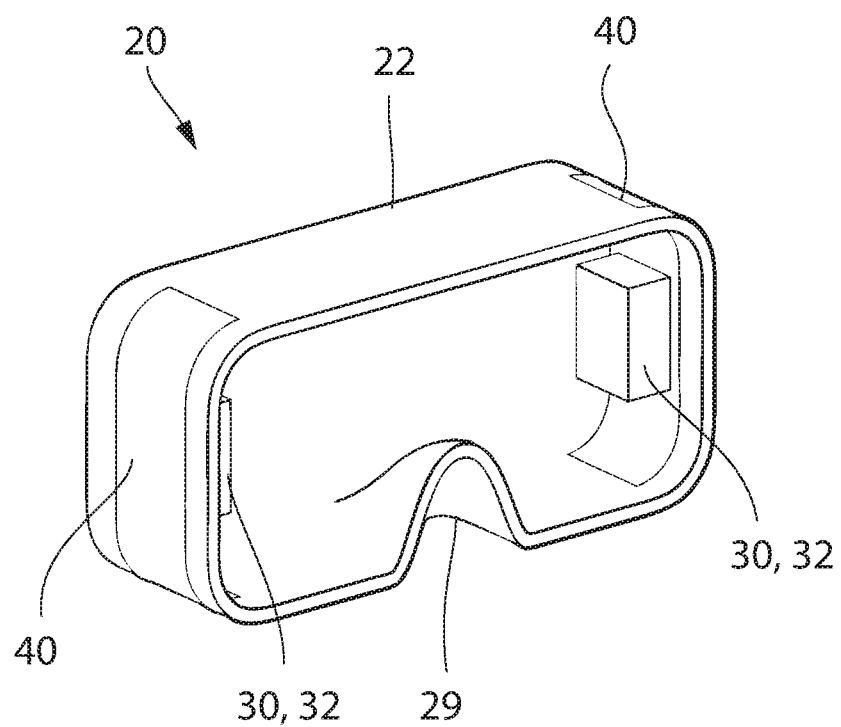

An exemplary embodiment of the present invention is explained in detail below with reference to the accompanying drawings. In the drawings:

FIG. 1 shows a perspective illustration of the underwater VR headset with a diving mask and an underwater display unit, the underwater display unit being arranged behind the diving mask in the viewing direction, FIG. 2 shows a greatly simplified schematic sectional illustration of the underwater VR headset according to FIG. 1, FIG. 3 shows a perspective illustration of a further development of the underwater VR headset according to FIG. 1, wherein the underwater VR headset is loaded with weights in order to compensate for the buoyancy of the underwater VR headset, FIG. 4 shows a perspective illustration of a second further development of the underwater VR headset according to FIG. 1, wherein the housing of the underwater display unit is formed in several parts, and FIG. 5 shows a perspective illustration of a third further development of the underwater VR headset according to FIG. 1, wherein heat exchangers are arranged on the outside of the underwater VR headset, by means of which heat can be dissipated from the VR display unit.

Various further developments of an underwater VR headset 1 are explained below with reference to FIGS. 1 to 5, wherein the features of the individual further developments can be combined with one another. Identical or functionally identical parts are provided with the same reference symbols in the Figures.

FIG. 1 shows an exemplary embodiment of the underwater VR headset 1 comprising a diving mask 10 and an underwater display unit 20.

In the exemplary embodiment shown, the diving mask 10 is a mask which partially covers a face (not shown) of a user (not shown) or a diver. It goes without saying that the diving mask 10 can also be a full face mask or a diving helmet, the full face mask completely covering the face of the diver and the diving helmet completely surrounding the head of the diver.

The illustrated diving mask 10 comprises a frame 11 and a sealing lip 13. Furthermore, the diving mask 10 can comprise a viewing window 12, wherein the frame 11 encloses a receiving space 15 and the viewing window 12 is able to close off the receiving space 15 on the side facing away from the diver or user. The receiving space 15 can partially cover the face of the diver, including his eyes and nose, a nose pocket 19 being designed to accommodate the user's nose. The sealing lip 13 is arranged around a circumferential edge of the receiving space 15 or the frame 11, which lip lies tightly against the face of the user or diver and prevents water from entering the receiving space 15 during the dive.

As shown schematically in FIG. 2, the diving mask 10 can be placed on the head of the user in such a way that the diving mask 10 is arranged completely in a field of vision in a viewing direction 5 of the user. The field of vision corresponds to the area that the user or diver can visually detect by turning or swiveling his eyes. In FIG. 2, the user's eyes are oriented in the viewing direction 5.

The diving mask 10 or the underwater VR headset 1 is held on the head of the user by means of a tension strap 16, wherein the tension strap 16 provides a sufficiently large tension force to keep the underwater VR headset 1 firmly in the intended position in the event of dynamic movements of the user and underwater currents.

The underwater display unit 20 is arranged behind the diving mask 10 in the viewing direction 5, and the underwater display unit 20 can be detachably fastened to the diving mask 10 by means of first fastening means 18 on the diving mask 10 and second fastening means 27 on the underwater display unit 20. The underwater display unit 20 is designed to lie as flat as possible on the diving mask 10, and can have a recess 29 which corresponds to the nose pocket 19 of the diving mask 10.

The sectional illustration in FIG. 2 shows that the underwater display unit 20 comprises a housing 22 in which a VR display unit 25 is arranged. The VR display unit 25 is designed to reproduce a stereographic representation of virtual reality, wherein the VR display unit 25 is either formed from a single VR display unit 25 or from two VR display units 25, wherein each of the two VR display units 25 is designed to reproduce the corresponding virtual reality content for one eye at a time.

In a preferred design, the underwater display unit 20 can comprise a data processing means 30 and even more preferably also an energy store 32, the energy store 32 supplying the data processing means 30 and the at least one VR display unit 25 with electrical energy. The data processing means 30 comprises a storage medium (not shown) and can, together with a plurality of sensors (not shown), which adjust the orientation and accelerations of the underwater VR headset 1 or the underwater display unit 20—such as VR headsets known from the prior art—detect and generate a representation of the virtual reality corresponding to the orientation of the underwater VR headset 1.

Furthermore, the underwater VR headset 1 comprises at least one level sensor 34. The level sensor 34 can be designed as a pressure sensor or optical sensor and measures the water pressure or optically the level of the water surface 4, wherein the at least one level sensor 34 is coupled to the data processing means 30 and virtual reality is generated on the basis of the measured values of the level sensor 34. This makes it possible, depending on the actual diving depth, to adapt the generated virtual reality to a "virtual" diving depth. In addition, a plurality of level sensors can be arranged on the underwater VR headset 1, by means of which the water surface is detected in order, for example, to also represent the water surface or the emergence realistically.

The housing 22 has optical accesses through which the user or the diver can detect the virtual reality content shown on the at least one VR display unit 25 in the viewing direction 5. These optical accesses can be, for example, an optical lens 28, in the focal point of which the VR display unit 25 is located in the viewing direction. The housing 22 is closed in a gas- and liquid-tight manner on the side facing the diving mask 10, wherein it is possible for the housing 22 to be closed by means of the at least one optical lens 28 and/or by means of at least one viewing window 26.

The housing 22 is absolutely gas- and liquid-tight, so that the electrical components within the housing 22 are protected on the one hand from moisture and on the other hand from contamination.

A diving situation of the underwater VR headset 1 is shown schematically in FIG. 2 and the underwater VR headset 1 is located below a water surface 4. Between the housing 22 of the underwater display unit 20 and the diving mask 10 there is a gap 8 through which the water can flow undisturbed, which prevents individual drops of water or dirt from disturbing the view from the diving mask 10 into the underwater display unit 20, on the one hand, and avoids oxygen bubbles when diving or swimming in order to have an undisturbed view of the virtual reality represented by the underwater display unit 20 or the at least one VR display unit 25 on the other hand. In addition, an ascent for the diver can be seen through the gap 8, as the water level behaves analogously to the diving depth during an ascent in the gap 8.

In addition, it can be seen from FIG. 2 that a further optical lens 18 is provided, which is arranged within the diving mask 10 in the viewing direction 5 between the diver and the viewing window 12. The optical lens 18 is ground and positioned in such a way that the diagonal of the field of vision is as large as possible. In particular, it is advantageous if the diagonal of the field of vision through the optical lens 18 in the diving mask 10 is at least 80°, preferably at least 90°, more preferably at least 100° and particularly preferably approx. 110°.

A further development of the underwater display unit 20 is shown in FIG. 3, from which it can be seen that weights 35 can be arranged in the housing 22, by means of which the buoyancy of the underwater display unit 20 can be kept as low as possible or can be compensated. By compensating for the buoyancy by means of the weights 35, the underwater VR headset 1 can be balanced in such a way that it floats at a certain water depth. The diver or the user therefore benefits from particularly great wearing comfort and does not have the feeling that the underwater VR headset 1 is pulling him upwards. There is also no risk of the underwater VR headset 1 becoming detached and floating up. The weights 35 can preferably be fastened within the housing 22 by a holding means, for example a clamp or clip connection, so that they do not affect the hydrodynamic properties of the underwater VR headset 1. Furthermore, the weights 35 can for example be energy storage cells of the energy store 32, whereby the number of energy storage cells can be used to set the additional weight to compensate for the buoyancy.

In the exemplary embodiment shown in FIG. 3, the weights 35 are arranged symmetrically to the diver, so that the greatest possible wearing comfort is given. The weights 35 can alternatively be attached at any location within the housing 22.

It can be seen from FIG. 4 that the housing 22 is a multi-part housing 22 with a first housing part 23 and at least one second housing part 24, which can be fastened to the first housing part 23 by means of a releasable lock in order to open the housing 22. By releasing the lock of the second housing part 24 an opening is uncovered, through which the VR display unit 25 can be accessed or replaced, for example for maintenance purposes, the energy store 32 can be charged or data can for example be exchanged with the storage medium. A seal is arranged between the housing parts 23, 24 or in the opening. The seal enables an absolutely gas- and pressure-tight closing of the opening by means of the lock.

In one design of the underwater VR headset 1 (not shown) the VR display unit 25, which is designed as a mobile terminal device, can be inserted into the housing through the opening. The VR display unit 25 can be a smartphone or a tablet or the like. It is particularly preferred if a holding frame can be replaced or inserted into the housing 22 through the opening, in which frame the VR display unit 25 is fixedly arranged, so that even with different models of mobile terminal devices it is ensured that the display unit is located within the focus of the optical lens 28.

In order to prevent heat build-up in the gas- and liquid-tight housing 22, a heat exchanger 40 can be arranged on at least one outer wall of the housing 22, as shown in FIG. 5, which is coupled with the data processing means 30, the energy store 32 or the VR display unit 25, for example by means of heat conductors 42. While the housing 22 is typically made of a plastic, the heat exchangers 40 are preferably made of a metallic material and are more preferably cast into the housing 22, so that water is flushed through the side of the heat exchanger 40 facing away from the VR display unit 25 or the housing 22 when diving with the underwater VR headset 1 and heat can be effectively removed from the interior of the housing 22. The heat conductors 42 are preferably designed as a two-phase thermosiphon or a heat pipe, which are characterized in that these heat conductors 42 can transport a high heat flow out of the housing 22, whereby the electrical components located in the housing 22 are protected against overheating. In the illustrated exemplary embodiment two heat exchangers 40 are provided, which are arranged on the side walls of the underwater display unit, but it is also conceivable that the heat exchangers 40 can for example be arranged on the end face of the underwater display unit 20 facing away from the diver. In the illustrated exemplary embodiment the heat sources are arranged directly adjacent on the side of the heat exchanger 40 facing away from the water. The data processing means 30, for example the GPU or CPU, or the energy store 32 can for example be arranged directly on the heat exchanger 40.

LIST OF REFERENCE NUMERALS

1 Underwater VR Headset
4 Water surface
5 Viewing direction
8 Gap
10 Diving mask
11 Frame
12 Viewing window
13 Sealing lip
15 Receiving space
16 Tension strap
17 First fastening means
18 Lens
19 Nose pocket
20 Underwater display unit
22 Housing
23 First housing part
24 Second housing part
25 Display unit
26 Viewing window
27 Second fastening means
28 Lens
29 Recess
30 Data processing means
32 Energy store
34 Level sensor
35 Weights
40 Heat exchanger
42 Heat conductor

The invention claimed is:

1. An underwater VR headset (1), comprising:
a diving mask (10), which can be placed on a face in viewing direction (5) on the head of a diver, and
an underwater display unit (20),
wherein the underwater display unit (20) is arranged behind the diving mask (10) in the viewing direction (5) of the diver,
wherein the underwater display unit (20) comprises a housing (22) and at least one VR display unit (25) arranged in the housing (22),
wherein a virtual reality represented by the VR display unit (25) can be perceived by the diver through the diving mask (10) and the housing (22), wherein the housing (22) is gas- and liquid-tight; and
wherein the diving mask (10) has first fastening means (17), the underwater display unit (20) has second fastening means (27), and the underwater display unit (20) is detachably held by the first fastening means (17) and the second fastening means (27) on the diving mask (10).

2. The underwater VR headset (1) according to claim 1, characterized in that the first fastening means (17) and the second fastening means (27) enable the underwater display unit (20) to be pivoted on the diving mask (10).

3. The underwater VR headset (1) according to claim 1, characterized in that the diving mask (10) has at least one optical lens (18), which is arranged in the viewing direction (5) between the diver and the underwater display unit (20).

4. The underwater VR headset (1) according to claim 1, characterized in that the diving mask (10) and/or the underwater display unit (20) has or have at least one holding means, and that at least one weight (35) can be attached to the holding means.

5. The underwater VR headset (1) according to claim 4, characterized in that the holding means comprise a clamp, clip or magnetic connection.

6. The underwater VR headset (1) according to claim 1, characterized in that
a data processing means (30), which generates virtual reality, is arranged in the housing (22).

7. The underwater VR headset (1) according to claim 1, characterized in that
at least one level sensor (34) is provided, and that the at least one level sensor (34) is coupled to the data processing means (30).

8. The underwater VR headset (1) according to claim 1, characterized in that the housing (22) is formed from a first housing part (23) and at least one second housing part (24), between which a seal is arranged or formed.

9. The underwater VR headset (1) according claim 8, characterized in that the first housing part (23) and the second housing part (24) are closed in a gas- and liquid-tight manner by means of a lock.

10. The underwater VR headset (1) according to claim 1, characterized in that the VR display unit (25) is a mobile terminal device, in particular a smartphone.

11. The underwater VR headset (1) according to claim 1, characterized in that the housing (22) comprises a removable frame, and that the VR display unit (25) can be inserted into the removable frame.

12. The underwater VR headset (1) according to claim 1, characterized in that the housing (22) has at least one heat exchanger (42), which is arranged on an outer side of the housing.

13. The underwater VR headset according claim 1, characterized in that at least one heat conductor (42) is arranged in the housing (22), which creates a thermal coupling between the VR display unit (25) and the heat exchanger (40).

14. The underwater VR headset (1) according to claim 13, characterized in that the heat conductor (42) comprises at least one heat pipe and/or at least one two-phase thermosiphon.

15. The underwater VR headset (1) according to claim 1, characterized in that the diving mask (10) and the housing (22) of the underwater display unit (20) are arranged spaced apart, and that a water-flushable gap (8) is formed between the diving mask (10) and the housing (22).

16. The underwater VR headset (1) according to claim 1, characterized in that the diving mask (10) and the underwater display unit (20) are connected in a gas- and liquid-tight manner, and that the diving mask (10) is closed on the side facing away from the diver by the underwater display unit (20).

17. A diving mask (10) for the underwater VR headset (1) according to claim 1.

18. An underwater display unit (20) for the underwater VR headset (1) according to claim 1.

\* \* \* \* \*